US012023889B2

(12) United States Patent
Ward et al.

(10) Patent No.: US 12,023,889 B2
(45) Date of Patent: Jul. 2, 2024

(54) APPARATUS INCLUDING A TAPE APPLICATOR HEAD

(71) Applicant: Vivid Laminating Technologies Ltd, Ashby de la Zouch (GB)

(72) Inventors: Gavin Ward, Ashby de la Zouch (GB); Lewis Evans, Ashby de la Zouch (GB)

(73) Assignee: Vivid Laminating Technologies Ltd, Ashby de la Zouch (GB)

(*) Notice: Subject to any disclaimer, the term of this patent is extended or adjusted under 35 U.S.C. 154(b) by 283 days.

(21) Appl. No.: 17/572,763

(22) Filed: Jan. 11, 2022

(65) Prior Publication Data

US 2022/0227090 A1 Jul. 21, 2022

(30) Foreign Application Priority Data

Jan. 21, 2021 (GB) .................................... 2100811

(51) Int. Cl.
*B31B 50/72* (2017.01)
*B31B 50/04* (2017.01)
*B31B 50/20* (2017.01)

(52) U.S. Cl.
CPC .............. *B31B 50/72* (2017.08); *B31B 50/04* (2017.08); *B31B 50/20* (2017.08)

(58) Field of Classification Search
CPC ......... B31B 50/40; B31B 50/60; B31B 50/72; B65H 35/0033
See application file for complete search history.

(56) References Cited

U.S. PATENT DOCUMENTS

| | | | |
|---|---|---|---|
| 5,624,369 A * | 4/1997 | Bidlack | B31B 50/00 83/681 |
| 2003/0056905 A1 | 3/2003 | Kuhn | |
| 2005/0247173 A1 | 11/2005 | Alsten | |
| 2006/0096712 A1 | 5/2006 | Makar et al. | |
| 2006/0249249 A1* | 11/2006 | Bills | E06B 3/685 156/267 |
| 2020/0361654 A1* | 11/2020 | Sytema | B65D 5/2052 |

FOREIGN PATENT DOCUMENTS

| | | | | |
|---|---|---|---|---|
| CN | 211000196 U | 7/2020 | | |
| CN | 112078888 A | 12/2020 | | |
| EP | 1310449 A2 * | 5/2003 | | B65H 35/0013 |
| EP | 1310449 A3 | 8/2009 | | |
| EP | 3715143 A1 | 9/2020 | | |

OTHER PUBLICATIONS

UKIPO, Combined Search and Examination Report for corresponding UK Patent Application No. GB2100811.5, dated Jul. 20, 2021, 2 pages.

* cited by examiner

*Primary Examiner* — Daniel Mcnally
(74) *Attorney, Agent, or Firm* — NK Patent Law

(57) ABSTRACT

A digital flatbed cutter is described. The cutter includes a flatbed on which a workpiece can be positioned. A head unit is movable in a plane above the flatbed. A tape applicator head and a cutter head are mounted to the head unit. The tape applicator head includes an applicator roller for applying a strip of tape to the workpiece that is rotatable about an axis that is normal to the plane so that strips of tape can be applied to the workpiece in any direction. The cutter head includes a knife or blade for cutting the workpiece. A creaser head that includes a creaser wheel for creasing the workpiece can also be mounted to the head unit.

11 Claims, 5 Drawing Sheets

APPARATUS INCLUDING A TAPE APPLICATOR HEAD

CROSS-REFERENCE TO RELATED APPLICATION(S)

This application claims priority to UK Patent Application No. GB2100811.5 filed on Jan. 21, 2021, the entire content of which is incorporated by reference herein.

TECHNICAL FIELD

The invention relates to an apparatus including at least one tape applicator head for applying strips of tape to a workpiece. The workpiece may comprise a sheet of material such as card or paper stock, for example.

BACKGROUND OF THE INVENTION

It is known to apply a strip of tape to a workpiece using a hand-held tape gun.

It is also known to apply a strip of tape to a workpiece using a tape applicator. A conventional tape applicator typically comprises at least one tape applicator head which applies a strip of tape in a transferring direction, i.e., the direction along which the workpiece is moved. The position of each tape applicator head can be adjusted in a lateral direction that is perpendicular to the transferring direction. If two or more tape applicators are provided, multiple strips of tape can be applied to the workpiece in a single pass through the tape applicator.

The workpiece is normally fed past the tape applicator heads, which are independently controlled to apply a strip of tape to the workpiece. Each tape strip runs in the transferring direction and its length is determined by the tape applicator head. If it is necessary to apply tape strips to the workpiece in multiple directions—e.g., along all four edges of a rectangular workpiece or applied to glue tabs of a packaging blank that are arranged in different directions—the tape strips must be applied in multiple passes through the tape applicator. For example, if the tape applicator has two tape applicator heads, tape strips can be applied to two opposite edges of a rectangular workpiece in a first pass. The workpiece is then rotated by 90° and passed through the tape applicator for a second time so that tape strips can be applied to the other two opposite edges of the workpiece.

Each tape applicator head can be controlled to apply a strip of tape of desired length to a particular part of the workpiece. Each tape applicator head typically includes a plurality of rollers which can be driven or non-driven. At least one roller is used to apply the tape to the surface of the workpiece (an "applicator roller") and other rollers are guide rollers. The tape is typically supplied on a roll or spool and is fed down to the applicator roller. The tape can be fed around individual guide rollers or between pairs of counter-rotating guide rollers. Each tape applicator head typically includes a support for supporting the tape roll and a knife or blade for cutting the tape to the desired length as it is being applied to the workpiece.

The tape applicator head can be used to apply any suitable sort of tape to the workpiece, e.g., double-sided adhesive tape or silicone tape. The tape applicator head can normally accommodate different widths of tape.

The tape applicator can include a feed mechanism for feeding the workpiece past the tape applicator head(s).

Digital flatbed cutters are known. In a typical cutter of this type, a workpiece such as a sheet of card or paper stock is placed on a flatbed. A cutter head is mounted above the flatbed on an assembly that can move the cutter head in a controlled way in a parallel plane above the flatbed (i.e., in a plane defined by an x-axis and a perpendicular y-axis). The cutter head includes a knife or blade for cutting the workpiece. The knife or blade can typically move vertically relative to the flatbed (i.e., in a z-axis direction that is perpendicular to both the x- and y-axes directions). In particular, the knife or blade can be moved between a first position where it is spaced apart from the workpiece and a second position where it is in contact with the workpiece for cutting.

The assembly can include a head unit on which the cutter head is mounted. The head unit can move in a first direction (i.e., a y-axis direction) along a support rail that extends over the flatbed. The support rail itself can move in a second direction (i.e., an x-axis direction) along side rails that are located at the sides of the flatbed, for example.

The cutter can include a feed mechanism for positioning a workpiece on the flatbed.

A creaser head can also be mounted on the head unit next to the cutter head. The creaser head can include a creaser wheel for creasing the workpiece. The creaser wheel can typically move vertically relative to the flatbed—in particular, the creaser wheel can be moved between a first position where it is spaced apart from the workpiece and a second position where it is in contact with the workpiece for creasing.

The head unit can be aligned precisely with the workpiece before the cutting and/or creasing process is started. For example, the head unit can include a camera and use optical recognition of one or more printed registration marks on the workpiece. Once the head unit has been precisely aligned relative to the workpiece positioned on the flatbed, the workpiece can be cut by the cutter head and/or creased by the creaser head based on information stored in a digital file. In particular, the digital file can include cutting information and/or creasing information for controlling the cutter. The workpiece can be cut and then creased or vice versa. After it has been cut and/or creased, the workpiece is removed from the flatbed.

It is often necessary to apply one or more strips of tape to a workpiece that has been cut using a digital flatbed cutter. For example, if the workpiece has been cut and creased to form a packaging blank that is to be folded and assembled to form a box or container, double-sided adhesive tape must often be applied to one or more glue tabs of the packaging blank. It is therefore necessary to either apply the strips of tape to the packaging blank manually using a hand-held tape gun, or to pass the packaging blank through a separate tape applicator one or more times.

SUMMARY OF THE INVENTION

The present invention provides an apparatus comprising:

a flatbed on which a workpiece can be positioned;

a tape applicator head including an applicator roller for applying a strip of tape to the workpiece; and a head unit to which the tape applicator head is mounted;

wherein the head unit is movable in a plane above the flatbed and at least the applicator roller is rotatable about an axis that is normal to the plane. Put another way, the head unit is movable laterally along one or both of an x-axis direction and a perpendicular y-axis direction in a parallel plane above the flatbed, and at least the applicator roller is mounted to be rotatable about a z-axis that is perpendicular to the x- and y-axes.

The applicator roller is also mounted to be rotatable about a longitudinal axis of the applicator roller that is parallel with the plane and it will be understood that the roller will rotate about this longitudinal axis when the tape is being applied to the workpiece.

The tape applicator head is generally similar to the tape applicator head described above and can further include a support for supporting a tape roll and one or more guide rollers for guiding the tape from the tape roll to the applicator roller. Each guide roller can be a single roller or a pair of counter-rotating rollers, for example. The tape roll can be supported so as to be freely rotatable when tape is being removed and applied to the workpiece. For example, the support can include a rotatable hub that is sized and shaped to be received in an opening in the tape roll. Each roller can be a driven roller—i.e., which is driven to rotate by an actuator—or a non-driven roller—i.e., which is freely rotatable by the movement of the tape. The tape applicator head can include other stationary guides. The support for the tape roll may be positioned above the applicator roller and any other guide rollers or stationary guides.

The tape applicator head can further include a knife or blade for cutting the tape. The tape applicator head can be controlled to apply a strip of tape of a particular length to the workpiece where the starting point of the tape strip is determined by positioning the tape applicator head over the workpiece, the direction or orientation of the tape strip is determined by the subsequent movement of the tape applicator head, and the length of the tape strip is determined by cutting the tape.

The whole of the tape applicator head can rotate relative to the head unit, including the support for supporting the tape roll. Alternatively, the support can be fixed, and at least the applicator roller can rotate relative to the head unit if the one or more guide rollers can accommodate the relative rotation between the applicator roller and the tape roll. Such relative rotation might be limited to about 180° in some arrangements.

The tape applicator head can be used to apply any suitable tape to the workpiece, including double-sided adhesive tape, silicone tape etc. In the case of double-sided adhesive tape, the tape will normally be applied to the workpiece with the backing layer still adhered; which backing layer is then subsequently removed by hand to expose the underlying adhesive. But it is also possible for the backing layer to be removed by the tape applicator head when the tape is applied to the workpiece.

At least the applicator roller can move along the axis that is normal to the plane (i.e., along the z-axis direction) so that it can move into contact with the workpiece. In other words, at least the applicator roller can be mounted to be moved by an actuator between a first position where it is spaced apart from the workpiece and a second position where it is in contact with the workpiece for applying a strip of tape, and optionally where contact pressure is applied to the workpiece by the applicator roller.

The apparatus can include a feed mechanism for positioning a workpiece on the flatbed. Any suitable feed mechanism can be used, e.g., a vacuum feed that can be integrated into the head unit or the support rail and which can be used to pick up an individual workpiece from a stack and position it on the flatbed.

The flatbed can be a conveyor which can be used to remove a workpiece from the apparatus.

The head unit can be mounted on a support rail that extends over the flatbed. The head unit can be moved along the support rail (i.e., along the y-axis direction) by an actuator. The support rail can be mounted on one or more side rails. The support rail can be moved along the one or more side rails (i.e., along the x-axis direction) by one or more actuators. The side rails can be located at opposite sides of the flatbed, for example, and are arranged substantially perpendicular to the support rail. The support rail and side rails allow the head unit to be moved in any direction under precise control in one or both of the x- and y-axes—i.e., in the parallel plane above the flatbed. It will be understood that other ways of moving the head unit under precise control can also be used.

The movement of the head unit can be controlled by a control unit using a digital file with tape application information that is described in more detail below.

The present invention further provides a method of using the apparatus described above to apply a strip of tape to a workpiece positioned on the flatbed, wherein at least the applicator roller is rotated about the axis that is normal to the plane so as to be aligned with a particular direction, and the head unit is moved in that direction over the flatbed with the applicator roller in contact with the workpiece.

The present invention provides a tape applicator comprising the apparatus described above.

The present invention provides a cutter, e.g., a digital flatbed cutter, comprising the apparatus described above. The head unit can further include a cutter head with a knife or blade for cutting the workpiece. The cutter head can be mounted to the head unit next to the tape applicator head. The knife or blade can move along the axis that is normal to the plane (i.e., along the z-axis direction) so that it can move into contact with the workpiece. In particular, the knife or blade can be mounted to be moved by an actuator between a first position where it is spaced apart from the workpiece and a second position where it is in contact with the workpiece for cutting.

The head unit can further include a creaser unit with a creaser wheel for creasing the workpiece. The creaser unit can be mounted to the head unit next to the cutter head and/or the tape applicator head. The creaser wheel can move along the axis that is normal to the plane (i.e., along the z-axis direction) so that it can move into contact with the workpiece. In particular, the creaser wheel can be mounted to be moved by an actuator between a first position where it is spaced apart from the workpiece and a second position where it is in contact with the workpiece for creasing.

In use, a workpiece is positioned on the flatbed using the feed mechanism. The head unit is precisely aligned with the workpiece on the flatbed. For example, the head unit can include a camera or other optical device and the control unit can use optical recognition of one or more printed registration marks on the workpiece or the outline of the workpiece. The optical recognition allows the control unit to know the precise position and orientation of the workpiece on the flatbed and to precisely align the head unit with the workpiece. Once the head unit has been precisely aligned, the workpiece can be cut by the cutter head and/or creased by the creaser head based on a digital file. One or more strips of tape can also be applied to the workpiece using the tape applicator head. In particular, the tape applicator head is positioned over the workpiece by moving the head unit, at least the applicator roller is moved to the second position where it contacts the workpiece and contact pressure is applied, and the head unit is moved in a particular direction (which may be along one or both of the x- and y-axes) with the applicator roller aligned with the particular direction and in contact with the workpiece to apply a strip of tape of desired length to the workpiece. The applicator roller is moved to the first position and the tape applicator head is repositioned over the workpiece by moving the head unit. The tape application process is repeated until all of the tape strips have been applied when the process is ended. During the tape application process, the applicator roller can be rotated about the z-axis to allow tape strips to be applied to the workpiece in any direction. The applicator roller will be rotated about the z-axis so that it is aligned with the direction in which the head unit is moved when the tape is being applied to the workpiece. This is different from a conventional tape applicator where tape strips can only be applied to the workpiece along the transferring direction, i.e., the direction in which the workpiece is passed by the stationary tape applicator head(s).

The cutter can be controlled using a digital file. The digital file includes tape application information which specifies where each tape strip should be applied to the workpiece. The digital file also includes cutting information and/or creasing information which specifies where the workpiece should be cut and/or creased. Typically, the workpiece will be cut, creased and then tape will be applied using the tape applicator head. But it will be understood that the cutting, creasing and tape application processes can be carried out in any order and can be split into several sub-processes that are carried out in any order—so that two separate cutting sub-processes may be carried out with an interposing creasing process or tape application process, for example.

In a preferred arrangement, the present invention provides a digital flatbed cutter comprising:

- a flatbed on which a workpiece can be positioned;
- a tape applicator head including an applicator roller for applying a strip of tape to the workpiece;
- a cutter head including a knife or blade for cutting the workpiece; and
- a head unit to which the tape applicator head and the cutter head are mounted;
- wherein the head unit is movable in a plane above the flatbed and at least the applicator roller is rotatable about an axis that is normal to the plane.

Additional features of the cutter are as described above. In particular, the cutter can include a creaser head mounted to the head unit, a feed mechanism etc.

DRAWINGS

Figure 1:
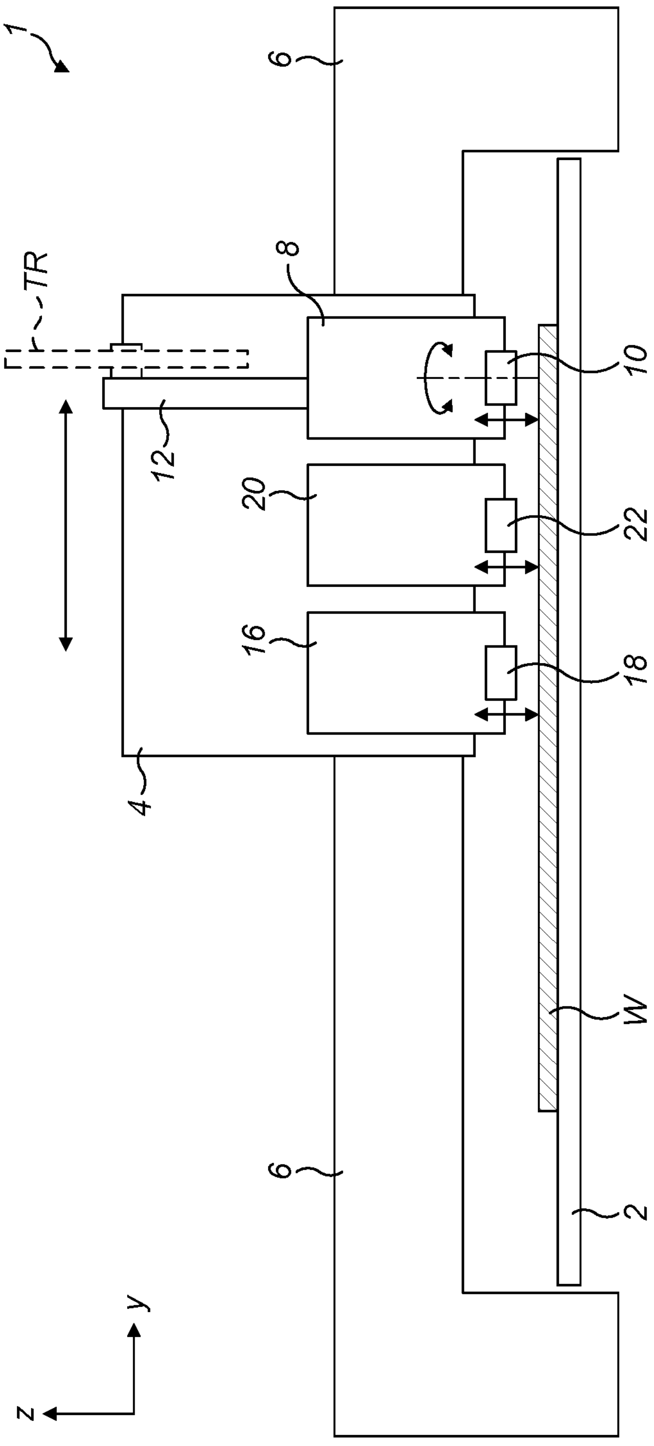
FIG. 1 is a schematic front view of a digital flatbed cutter according to the present invention.
Figure 2:
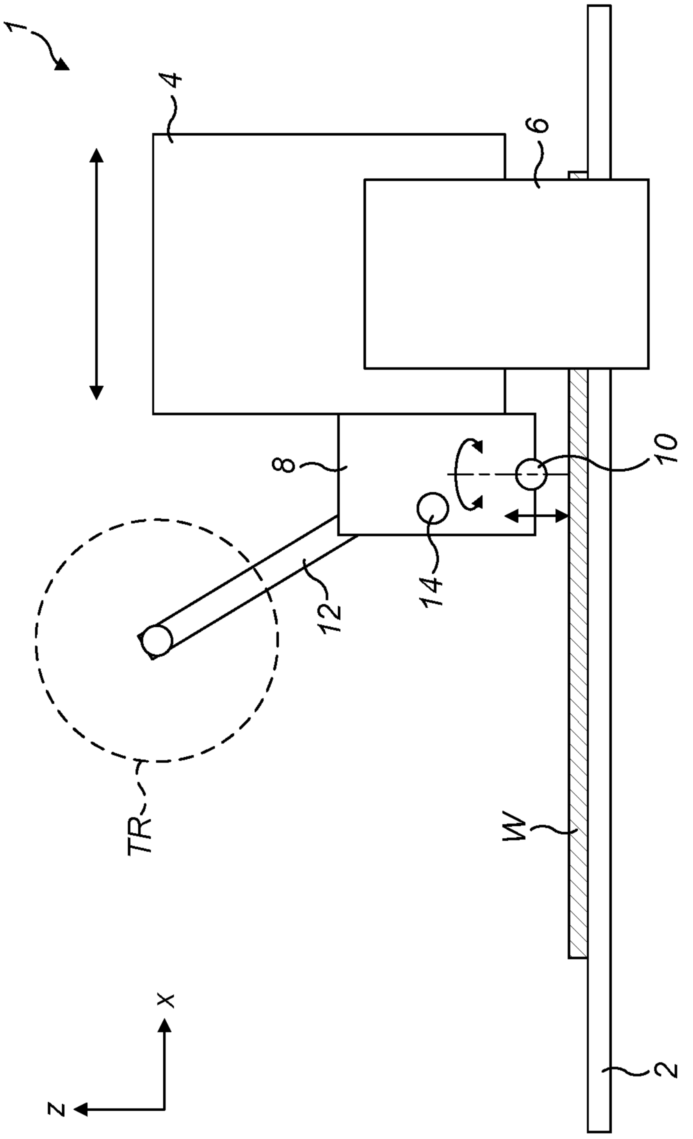
FIG. 2 is a schematic side view of the cutter of FIG. 1.

As shown in FIGS. 1 and 2, a digital flatbed cutter 1 includes a flatbed 2 on which a workpiece W can be positioned.

A head unit 4 is mounted above the flatbed 2. The head unit 4 is mounted on a support rail 6 and can move from side to side along the support rail (i.e., along a y-axis direction) by a suitable actuator (not shown). The support rail 6 is mounted on side rails (not shown) and can move backwards and forwards along the side rails (i.e., along an x-axis direction) by one or more suitable actuators (not shown). The actuators are controlled by a control unit (not shown) which can include a suitable processor and a user input device such as a touch display screen or keypad, for example. By controlling the actuators, the head unit 4 can be positioned precisely and can be moved in any direction in a parallel plane above the flatbed 2 defined by the perpendicular x- and y-axes.

The head unit 4 includes a tape applicator head 8.

The tape applicator head 8 includes an applicator roller 10 for applying a strip of tape to the workpiece 8. The applicator roller 10 is mounted to be rotatable about an axis that is normal to the plane (i.e., about the z-axis). This is in addition to the normal rotation of the applicator roller 10 about its longitudinal axis that is parallel to the plane and about which the applicator roller rotates when it is in contact with the workpiece and applying tape to the workpiece.

The tape applicator head 8 includes a support bracket 12 for supporting a tape roll TR and one or more guide rollers 14 for guiding the tape from the tape roll to the applicator roller 10.

The tape roll TR is supported on the support bracket 12 so as to be freely rotatable when tape is being removed and applied to the workpiece. The tape applicator head 8 can be compatible with different tape types and widths with tape rolls being easily interchanged on the support bracket 12. In particular, the support bracket 12 includes a rotatable hub that is sized and shaped to be received in an opening in the tape roll TR.

Each guide roller 14 can be a driven roller or a non-driven roller—i.e., which is freely rotatable by the movement of the tape. The tape applicator head 8 includes a knife or blade (not shown) for cutting the tape.

The applicator roller 10 is mounted so that it can move along the axis that is normal to the plane (i.e., along the z-axis direction). The applicator roller 10 can be moved by an actuator between a first position—shown in FIGS. 1 and 2—where it is spaced apart from the workpiece W and a second position where it is in contact with the workpiece for applying a strip of tape, and optionally where contact pressure is applied to the workpiece by the applicator roller.

The head unit 4 also includes a cutter head 16 with a knife or blade 18 and a creaser head 20 with a creaser wheel 22. The tape applicator head 8, cutter head 16 and creaser head 20 are conveniently referred to below as "tool heads" and the applicator roller 10, knife or blade 18 and creaser wheel 22 as "tools". The knife or blade 18 is mounted so that it can move along the axis that is normal to the plane (i.e., along the z-axis direction). The knife or blade 18 can be moved by an actuator between a first position—shown in FIGS. 1 and 2—where it is spaced apart from the workpiece W and a second position where it is in contact with the workpiece for cutting. The creaser wheel 22 is also mounted so that it can move along an axis that is normal to the plane (i.e., along the z-axis direction). The creaser wheel 22 can be moved by an actuator between a first position—shown in FIGS. 1 and 2—where it is spaced apart from the workpiece W and a second position where it is in contact with the workpiece for creasing.

The up and down movement of the tools in the z-axis direction is controlled by the control unit. The control unit can therefore position the head unit 4 over the workpiece W so that the appropriate tool head is at the required position, move the appropriate tool down into contact with the workpiece, move the head unit with the tool in contact with the workpiece to cut, crease or apply tape, move the tool up and away from the workpiece, and reposition the head unit over the workpiece. If the tool is the applicator roller 10, it is rotated about the z-axis so that it is aligned with the direction in which the head unit 4 will be moved over the flatbed 2 (i.e., so that its longitudinal axis is substantially perpendicular to the movement direction of the head unit).

The cutter 1 can include a feed mechanism (not shown) for positioning a workpiece on the flatbed 2. Any suitable feed mechanism can be used, e.g., a vacuum feed that can be integrated into the head unit 4 or the support rail 6 and which can be used to pick up an individual workpiece from a stack and position it on the flatbed 2.

The flatbed 2 can be a conveyor which can be used to remove a workpiece from the cutter 1.

The movement of the head unit 4 can be controlled by the control unit using a digital file.

Figure 3:
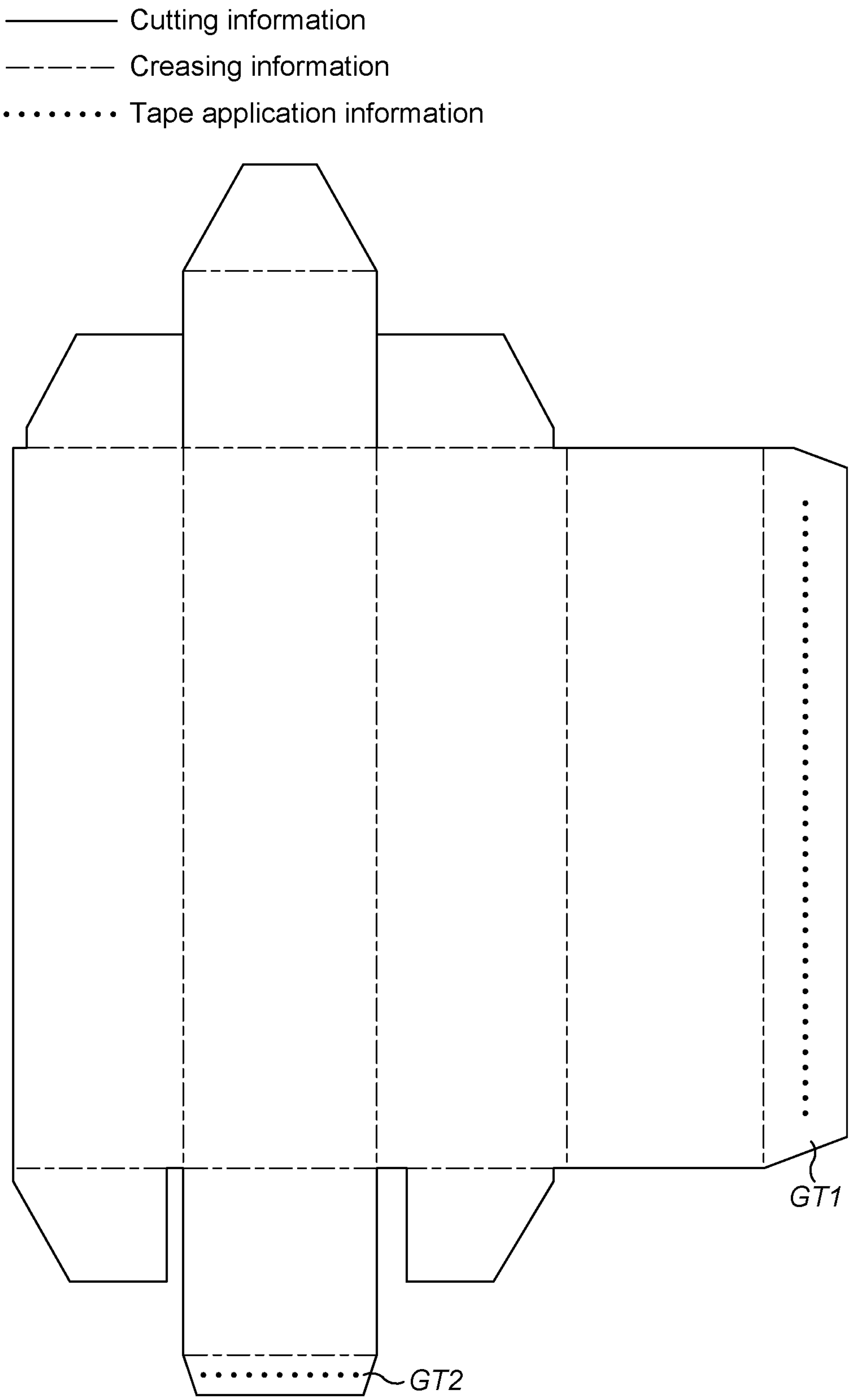
FIG. 3 is a visual representation of a digital file for controlling the cutter according to the present invention.

A visual representation of the digital file for a packaging blank is shown in FIG. 3 where cutting information is shown in solid line, creasing information is shown in dashed line and tape application information is shown in dotted line. In particular, the solid line indicates where the workpiece W shown in FIG. 4 should be cut by the cutting head 16, the dashed line indicates where the workpiece should be creased by the creasing head 20, and the dotted line indicates where a strip of tape of pre-determined width should be applied to the workpiece.

Figure 4:
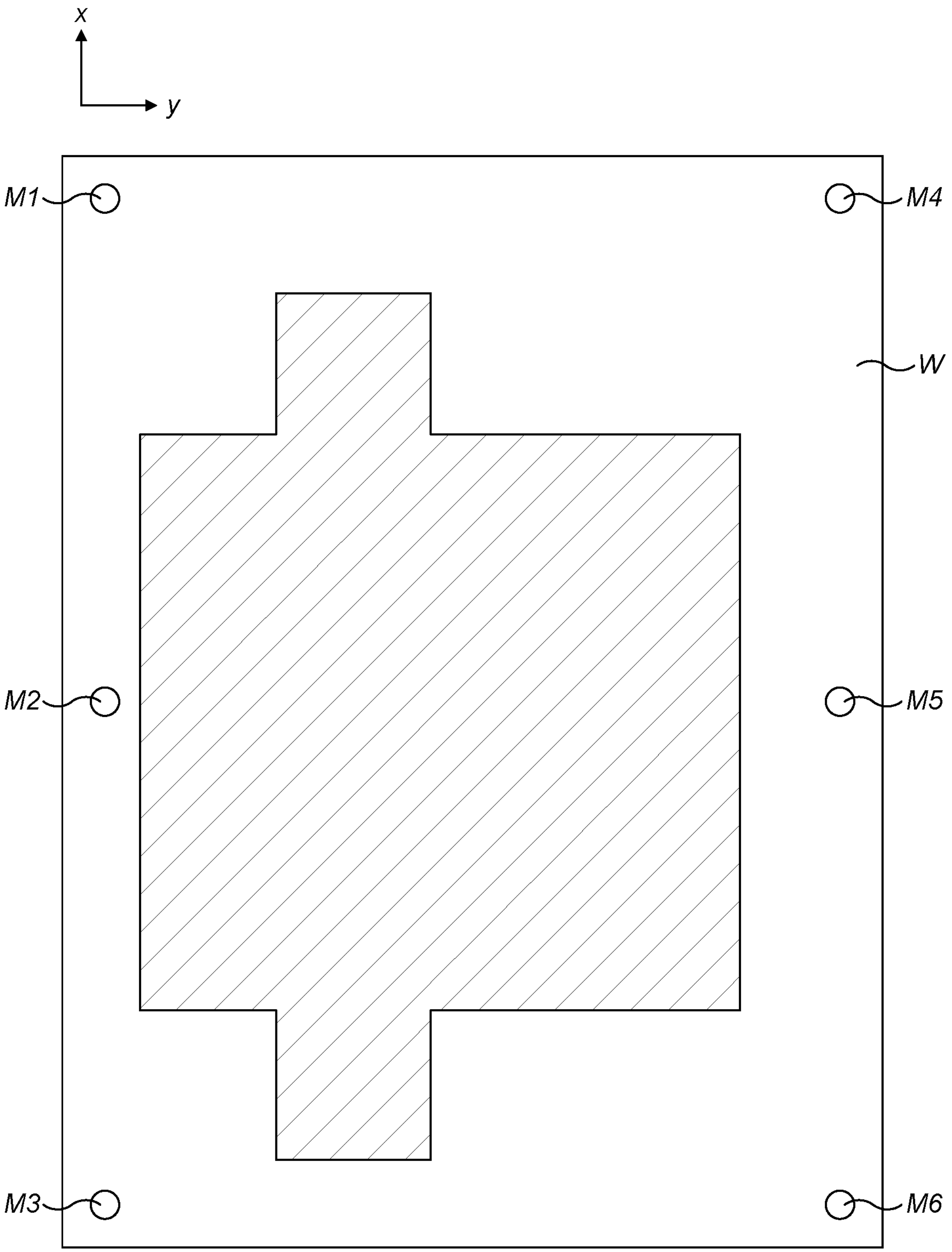
FIG. 4 is a top view of a workpiece.

The workpiece W shown in FIG. 4 is a printed sheet of card stock. The workpiece W has printed areas that are indicated by the shading and which will be the outer surfaces of an assembled container. The workpiece W also includes six printed registration marks M1, M2, . . . , M6.

The workpiece W shown in FIG. 4 is positioned on the flatbed 2 using the feed mechanism (not shown). A stack of identical workpieces can be located at an end of the flatbed 2 and an individual workpiece can be picked from the stack and positioned on the flatbed. The head unit 4 is precisely aligned with the workpiece W. For example, the head unit 4 can include a camera (not shown) and the control unit can use optical recognition of the printed registration marks M1, M2, . . . , M6 to determine the precise position and orientation of the workpiece W on the flatbed 2. Once the head unit 4 has been precisely aligned relative to the workpiece, the workpiece can be cut by the cutter head 16, creased by the creaser head 20, and tape can be applied by the tape applicator head 6 based on the respective information in the digital file.

More particularly, after the workpiece W has been cut and creased, in a tape application process, the head unit 4 can be positioned over a first glue tab GT1, the applicator roller 10 can be rotated about the z-axis to be aligned with the x-axis and moved down into contact with the workpiece, the head unit can be moved in the x-axis direction to apply a first tape strip S1 to the first glue tab GT1, the applicator roller can be moved up and away from the workpiece, the head unit can be re-positioned over a second glue tab GT2, the applicator roller can be rotated about the z-axis to be aligned with the y-axis and moved down into contact with the workpiece, the head unit can be moved in the y-axis direction to apply a second tape strip S1 to the second glue tab GT2, and the applicator roller 10 can be moved up and away from the workpiece. (This assumes that the workpiece W has been positioned on the flatbed 2 such that its edges are exactly aligned with the x- and y-axes of the cutter. In practice, the edges of the workpiece W are likely to be mis-aligned with the x- and y-axes of the cutter such that the head unit 4 is moved along directions that are angled slightly with respect to the x-axis direction and the y-axis direction with the applicator head 10 being rotated about the z-axis accordingly.) It will be understood that the applicator roller 10 is not limited to applying tape strips that are aligned with the x-axis direction or the y-axis direction. In practice, the applicator roller 10 can be rotated about the z-axis to be aligned with any direction in which the head unit 4 can be moved. For example, the applicator roller 10 can be used to apply a diagonal tape strip that is not aligned with either the x-axis direction or the y-axis direction. In some arrangements, the applicator roller 10 can be rotated about the z-axis while it is in contact with the workpiece and is applying tape if the movement direction of the head unit 4 changes.

Figure 5:
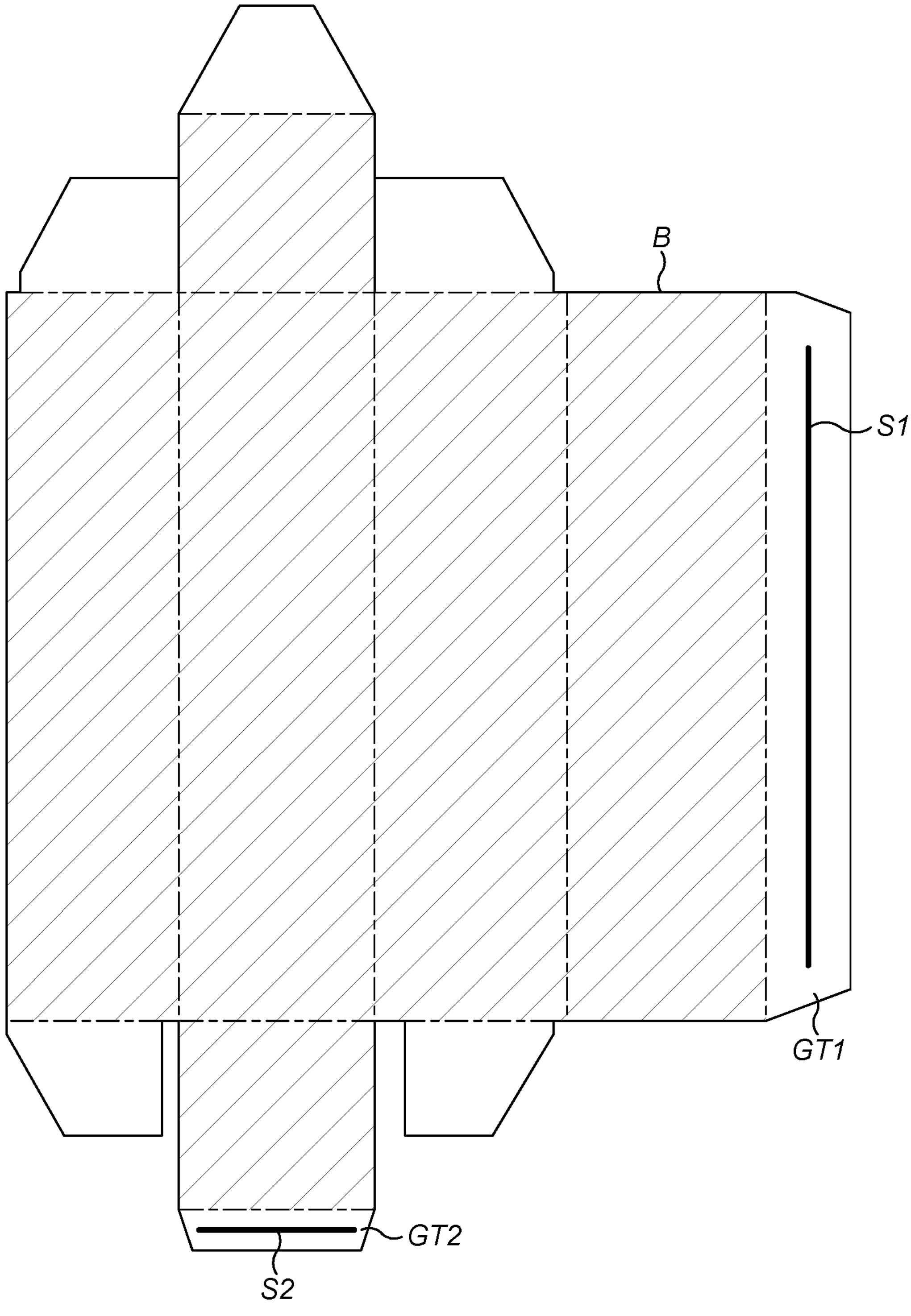
FIG. 5 is a packaging blank for a container produced from the workpiece using the cutter according to the present invention.

FIG. 5 shows a finished packaging blank B for a container with the tape strips S1 and S2 applied to the glue tabs GT1 and GT2. If the tape strips S1, S2 are double-sided tape, the backing layer can be removed to expose the adhesive and the packaging blank can be folded and assembled to form a container.

The invention claimed is:

1. A digital flatbed cutter comprising:

a flatbed on which a workpiece can be positioned;

a head unit movable laterally along an x-axis direction and a perpendicular y-axis direction in a parallel plane above the flatbed;

a tape applicator head mounted to the head unit and including an applicator roller adapted to apply a strip of double-sided adhesive tape to the workpiece, the applicator roller being rotatable about a z-axis that is normal to the plane and perpendicular to the x- and y-axes, and the applicator roller being movable along the z-axis;

a cutter head mounted to the head unit and including a knife or blade adapted to cut the workpiece, the knife or blade being movable along the z-axis;

a creaser head mounted to the head unit and including a creaser wheel adapted to crease the workpiece, the creaser wheel being movable along the z-axis; and a control unit adapted to control the movement of the head unit using a digital file with tape application information which specifies where each tape strip should be applied to the workpiece by the applicator roller of the tape applicator head, and cutting and creasing information which specifies where the workpiece should be cut by the knife or blade of the cutter head and creased by the creaser wheel of the creaser head.

2. The digital flatbed cutter of claim 1, wherein the tape applicator head further comprises a support for supporting a tape roll.

3. The digital flatbed cutter of claim 2, wherein the tape applicator head further comprises one or more guide rollers and/or one or more stationary guides for guiding the tape from the tape roll to the applicator roller.

4. The digital flatbed cutter of claim 2, wherein the whole of the tape applicator head is rotatable relative to the head unit, including the support for supporting the tape roll.

5. The digital flatbed cutter of claim 2, wherein the support for supporting the tape roll does not rotate relative to the head unit.

6. The digital flatbed cutter of claim 1, wherein the tape applicator head includes a knife or blade for cutting the tape.

7. The digital flatbed cutter of claim 1, further comprising a feed mechanism for positioning a workpiece on the flatbed.

8. The digital flatbed cutter of claim 1, wherein the flatbed is a conveyor.

9. A method of taping, cutting and creasing a workpiece to produce a packaging blank using a digital flatbed cutter, the digital flatbed cutter comprising:

a flatbed, a head unit movable laterally along an x-axis direction and a perpendicular y-axis direction in a parallel plane above the flatbed, a tape applicator head mounted to the head unit and including an applicator roller, the applicator roller being rotatable about a z-axis that is normal to the plane and perpendicular to the x- and y-axes, and the applicator roller being movable along the z-axis, a cutter head mounted to the head unit and including a knife or blade being movable along the z-axis, and a creaser head mounted to the head unit and including a creaser wheel being movable along the z-axis;

the method comprising:

positioning a workpiece on the flatbed; and in any order:

applying a strip of double-sided adhesive tape to the workpiece using the applicator roller, cutting the workpiece using the knife or blade, and creasing the workpiece using the creaser wheel, to produce the packaging blank.

10. The method of claim 9, wherein applying a strip of double-sided adhesive tape to the workpiece comprises rotating the applicator roller about the z-axis so that the applicator roller is aligned with a particular direction, and moving the head unit in that direction over the flatbed with the applicator roller in contact with the workpiece.

11. The method of claim 9, wherein the strip of double-sided adhesive tape is applied to a glue tab of the packaging blank.

* * * * *